Patented Nov. 5, 1946

UNITED STATES PATENT OFFICE 2,410,620

SULFONAMIDOBENZIMIDAZOLES

Charles F. H. Allen, Rochester, N. Y., and Alan Bell, Oak Ridge, Tenn., assignors to Eastman Kodak Company, Rochester, N. Y., a corporation of New Jersey No Drawing. Application April 20, 1944,
Serial No. 531,981

3 Claims. (Cl. 260—309)

This invention relates to sulfonamido-benzimidazoles, including sulfonamido-2-mercaptobenzimidazoles.

Sulfonamido derivatives of benzimidazole and of 2-mercaptobenzimidazole have not been reported in the literature. We have prepared such compounds, examples of which we describe below, together with methods of preparation of these compounds and their intermediates.

*Example 1.*—Preparation of intermediate compound, 3,4-diaminobenzenesulfonamide,

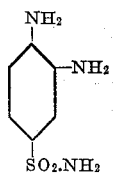

A mixture of 5 parts of 3-nitro-4-aminobenzenesulfonamide, 25 parts of alcohol, 15 parts of sodium hydrosulfite, and 50 parts of water was heated on the steam bath for 2 hours, and evaporated to dryness. The residue was extracted with hot alcohol, filtered, and the product from the extract finally crystallized from water. The yield was 2 parts, M. P. 174–175° C. (Analysis: Calcd. for $C_6H_9O_2N_3S$: N, 22.46. Found: N, 22.59.) 3,4-diaminobenzenesulfonamide can also be obtained in a yield of 80% by reducing an alcoholic solution of the nitro compound by hydrogen in the presence of Raney nickel.

*Example 2.*—5-sulfonamido-benzimidazole or 5-sulfamyl-benzimidazole,

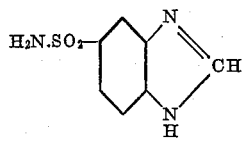

A mixture of 2 parts of 3,4-diaminobenzenesulfonamide, 2 parts of sodium formate, 10 parts of formic acid and 5 parts of water was left in an open vessel on the steam bath for 3–4 hours. The resulting paste was then taken up in water, treated with decolorizing carbon, filtered, concentrated and allowed to cool. 0.6 part of 5-sulfonamidobenzimidazole, M. P. 213–214° C., was obtained. (Analysis: Calcd. for $C_7H_7O_2N_3S$: N, 21.32. Found: N, 20.82, 20.79.)

*Example 3.*—2-methyl - 5 - sulfonamido-benzimidazole or 2-methyl-5-sulfamyl benzimidazole,

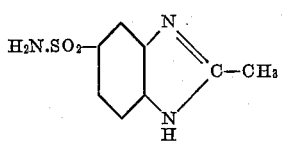

A mixture of 1 part of 3,4-diaminobenzenesulfonamide, 1 part of sodium acetate, 7 parts of acetic acid, and 3 parts of water was refluxed for 3 hours, and then heated in an open vessel on the steam bath; this resulted in the formation of a paste. The paste was dissolved in water, decolorized and filtered, and the filtrate concentrated and allowed to cool. The yield was 0.5 part. This crude compound was recrystallized from 95% alcohol. The purified product melts at 221° C. (Analysis: Calcd. for $C_8H_9O_2N_3S$: N, 19.90. Found: N, 19.54.)

*Example 4.*—Preparation of intermediate compound, $N^1$-(2'- hydroxyphenyl) - 3-nitrosulfanilamide,

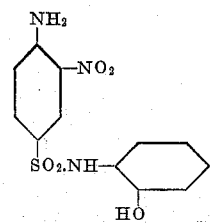

A mixture of 17 parts of 3-nitro-4-aminobenzene sulfonyl chloride, 7.8 parts of o-aminophenol, 10 parts of sodium acetate, and 50 parts of acetic acid was heated for ½ hour on the steam bath. The cold solution was diluted with an equal volume of water and left to crystallize. The yield was 15 parts. After recrystallization from ethyl alcohol, it melted at 205–206° C. (Analysis: Calcd. for $C_{12}H_{11}O_5N_3S$: N, 13.59. Found: N, 13.64.)

*Example 5.*—2-mercapto-5-sulfon-(2'-hydroxyanilido)-benzimidazole or 2'-hydroxy-phenyl-5-sulfamyl-2-mercapto-benzimidazole,

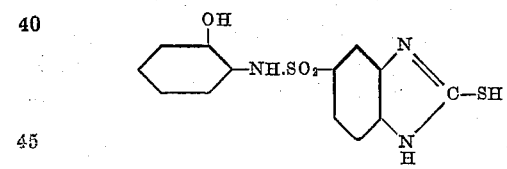

A solution of 8.6 parts of $N^1$-(2'hydroxyphenyl)-3-nitrosulfanilamide in 25 parts of alcohol was reduced in the presence of a Raney nickel catalyst at 40 lbs. hydrogen pressure at 90° C. The solution of the resulting diamine was cooled, filtered, and, after the addition of 5 parts of carbon disulfide and enough 40% sodium hydroxide solution to make alkaline, was heated over night on the steam bath. The solution was then concentrated to a small volume, diluted with water and acidified with hydrochloric acid. The precipitate was filtered, washed and dissolved in warm sodium carbonate solution. After treatment with decolorizing carbon and acidifying, the product was filtered, washed and dried. The yield was 4.8 parts, M. P. 265° C., with decomposition. (Analysis: Calcd. for $C_{13}H_{11}O_3N_3S_2$: N, 13.08. Found: N, 12.82.)

*Example 6.*—Preparation of intermediate compound, $N^1$-(4'-acetaminophenyl)-3-nitrosulfanilamide,

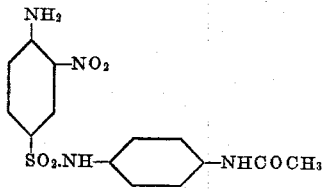

A mixture of 3 parts of 3-nitro-4-aminobenzene sulfonyl chloride, 1.5 parts of p-aminoacetanilide, 1.5 parts of potassium acetate, and 20 parts of acetic acid was warmed for ½ hour on the steam bath, cooled, diluted with water and left to crystallize. The yield, after recrystallization from acetic acid, was 2.8 parts, M. P. 265–266° C.

*Example 7.*—2-mercapto-5-sulfon-(4'-acetaminoanilido)-benzimidazole or 4'-acetamido-5-phenylsulfanyl-2-mercapto-benzimidazole

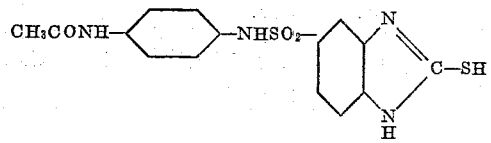

An alcoholic solution of 12 parts of $N^1$-4'-acetaminophenyl)-3-nitrosulfanilamide was reduced with hydrogen at 90° C. and 40 lbs. pressure in the presence of a Raney nickel catalyst. To the resulting solution of diamine, 10 parts of carbon disulfide was added, and sufficient 40% sodium hydroxide to make alkaline. After heating for 12 hours on the steam bath, the solution was evaporated to dryness, and the residue was dissolved in warm, dilute sodium hydroxide and treated with decolorizing carbon. Upon acidification with acetic acid, 8.5 parts of 2-mercapto-5-sulfon-(4'-acetaminoanilido)-benzimidazole was formed.

*Example 8.*—2-mercapto-5-sulfon-(4'-aminoanilido)-benzimidazole or 4'-amino-5-phenylsulfamyl-2-mercapto-benzimidazole

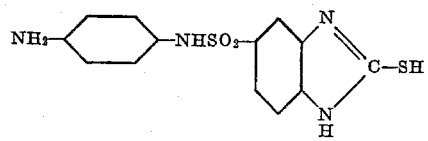

A mixture of 12 parts of 2-mercapto-5-sulfon-(4'-acetaminoanilido)-benzimidazole, 24 parts of concentrated hydrochloric acid and 100 parts of alcohol was heated on the steam bath for 2 hours; a clear solution resulted. It was diluted with water and made just basic (Congo red no longer changed color). The product (12 parts) was filtered, washed and dried, M. P. 240–242° C. with decomposition. (Analysis: Calcd. for $C_{13}H_{12}O_2N_4S_2$ C, 49.21; H, 3.48. Found: C, 48.84; H, 3.61.)

While we have given certain illustrative examples, it will be understood that other substituents than those shown may be present on the nitrogen of the sulfonamido (sulfamyl) group, and/or on the carbon in the 2-position of the heterocyclic ring.

What we claim as our invention and desire to be secured by Letters Patent of the United States is:

1. 2-mercapto-5-sulfon-(2'-hydroxyanilido)-benzimidazole.

2. 2-mercapto-5-sulfon-(4'-aminoanilido)-benzimidazole.

3. A compound having the structural formula:

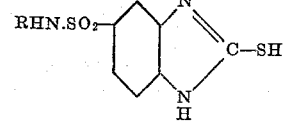

in which R is a member selected from the class consisting of H, hydrocarbon, and substituted hydrocarbon groups, the substituent in the hydrocarbon group being selected from the class consisting of hydroxyl, acetamido, and amino groups.

CHARLES. F. H. ALLEN.
ALAN BELL.